(12) United States Patent
Park et al.

(10) Patent No.: US 10,993,046 B2
(45) Date of Patent: Apr. 27, 2021

(54) SMARTPHONE-BASED HEARING AID

(71) Applicant: POSTECH ACADEMY-INDUSTRY FOUNDATION, Pohang-si (KR)

(72) Inventors: Hong June Park, Pohang-si (KR); Seong Eun Cho, Seoul (KR); Ki Hwan Sung, Pohang-si (KR); Won Cheol Lee, Pohang-si (KR); Hyeon Kyu Noh, Incheon (KR); Im Soo Mok, Pohang-si (KR)

(73) Assignee: POSTECH ACADEMY-INDUSTRY FOUNDATION, Pohang-si (KR)

( * ) Notice: Subject to any disclaimer, the term of this patent is extended or adjusted under 35 U.S.C. 154(b) by 212 days.

(21) Appl. No.: 16/462,145

(22) PCT Filed: Aug. 25, 2017

(86) PCT No.: PCT/KR2017/009320
§ 371 (c)(1),
(2) Date: Sep. 24, 2019

(87) PCT Pub. No.: WO2018/093019
PCT Pub. Date: May 24, 2018

(65) Prior Publication Data
US 2020/0021921 A1 Jan. 16, 2020

(30) Foreign Application Priority Data

Nov. 18, 2016 (KR) .................. 10-2016-0153925

(51) Int. Cl.
*H04R 25/00* (2006.01)
*H04M 1/725* (2021.01)
(Continued)

(52) U.S. Cl.
CPC .......... *H04R 25/405* (2013.01); *H04M 1/725* (2013.01); *H04M 1/72409* (2021.01);
(Continued)

(58) Field of Classification Search
CPC ....... H04R 25/00; H04R 25/55; H04R 25/558
(Continued)

(56) References Cited

U.S. PATENT DOCUMENTS 9,119,009 B1 * 8/2015 Folkmanis ............. H04R 25/55
9,736,600 B2 * 8/2017 Neumeyer ........... H04R 25/554
(Continued)

*Primary Examiner* — Suhan Ni
(74) *Attorney, Agent, or Firm* — Morgan, Lewis & Bockius LLP

(57) ABSTRACT

The present invention relates to a smartphone-based hearing aid which does not employ a separate power supply or digital signal processing device and instead has an analogue interface unit, configured with a single integrated circuit chip, connected between a plurality of microphones and a smartphone, thereby realizing a compact size, reducing the cost and enhancing the audio performance. Instead of employing a digital signal processing chip which is essentially used in the existing hearing aids or personal sound amplifiers, the smartphone-based hearing aid according to the present invention utilizes components such as a smartphone-embedded application processor (AP), RAM, digital-analogue converter, speaker and display and is therefore affordable. In particular, if a CPU and a GPU which are embedded in the application processor of the smartphone are utilized, digital signal processing necessary for the operation of the hearing aid can be performed within a short time of milliseconds (ms) just by using software.

28 Claims, 12 Drawing Sheets

(51) Int. Cl.
　　　*H04R 3/00*　　　　(2006.01)
　　　*H04M 1/72409*　　(2021.01)
　　　*G06F 5/06*　　　　(2006.01)
　　　*G06F 13/10*　　　(2006.01)
　　　*G06F 13/38*　　　(2006.01)

(52) U.S. Cl.
　　　CPC ........... *H04R 3/005* (2013.01); *H04R 25/407* (2013.01); *H04R 25/505* (2013.01); *H04R 25/55* (2013.01); *H04R 25/558* (2013.01); *G06F 5/06* (2013.01); *G06F 13/10* (2013.01); *G06F 13/382* (2013.01); *H04R 2225/55* (2013.01)

(58) Field of Classification Search
　　　USPC .................................................. 381/312, 315
　　　See application file for complete search history.

(56) References Cited

U.S. PATENT DOCUMENTS

| | | | |
|---|---|---|---|
| 10,111,018 B2 * | 10/2018 | Neumeyer | H04R 25/30 |
| 2014/0169599 A1 * | 6/2014 | Solum | H04R 25/554 |
| | | | 381/315 |
| 2015/0271608 A1 * | 9/2015 | Sabin | H04R 25/70 |
| | | | 381/314 |

* cited by examiner

SMARTPHONE-BASED HEARING AID

TECHNICAL FIELD

The present invention relates to a hearing aid and, more particularly, to a smartphone-based hearing aid, which can miniaturize the size, reduce expenses, and improve audio performance by connecting an analog interface unit configured with a single integrated circuit chip between a plurality of microphones and a smartphone without using a separate power supply device or digital signal processor.

BACKGROUND ART

In general, a recently well-used digital hearing aid is configured with two microphones, one signal processing chip in which an analog amplifier, an analog-digital converter, and a digital signal processor (DSP) are embedded in a single chip, a battery, and a speaker.

A hearing aid user commonly prefers that other people are rarely aware that the hearing aid user uses the hearing aid. Accordingly, recently, the hearing aid is located deep in the ear of a user, and the size of the hearing aid also tends to be gradually reduced. A battery is embedded in the hearing aid. As the size of the hearing aid is reduced, the size and capacity of the battery embedded in the hearing aid are reduced, and thus power consumption of the signal processing chip of the hearing aid needs to be reduced. Accordingly, as the size of the hearing aid is reduced, it is gradually difficult to execute high performance signal processing in the hearing aid.

Furthermore, recently, an average unit cost of one hearing aid exceeds US $2,300. If the hearing aids are used for both ears, the price becomes doubled. Accordingly, many people do not use the hearing aid although they become old and cannot hear very well because the hearing aid price is high as described above. From the year 2014, many personal sound amplification products (PSAPs) have been released, which have relatively simple hearing aid functions and have prices about a tenth of the existing hearing aid, but are not actively sold due to U.S. Food and Drug Administration (FDA) regulations that the PSAPs must be sold to only people who have normal hearing.

In the United States, as baby boomer generations enter sixties, demands for relatively cheap hearing aids are greatly increased. Accordingly, in order for users to purchase better performance hearing aids cheaply and easily, on October in 2015, President's council of advisors on science and technology (PCAST) recommended that hearing assistant product groups capable of being easily purchased online or at common stores should be produced in addition to the current expensive hearing aids that may be purchased through audiologists only and that the FDA regulations that the PSAPs must be sold to only people having normal hearing should be withdrawn. Accordingly, Starkey, that is, a hearing aid company of U.S.A., started PSAP business, and an interest in the PSAPs significantly increases. The PSAP and the hearing aid use almost the same technology. Accordingly, in the present invention, the hearing aid and the PSAP are collectively called a hearing aid.

A smartphone includes an audio codec (coder decoder) chip equipped with all microphone, speaker, and audio input and output signal processing functions, and an application processor (hereinafter referred to as an "AP") chip in which a central processing unit (CPU) and a graphic processing unit (GPU) are embedded. Accordingly, the smartphone have all the elements necessary for a hearing aid operation embedded therein. Accordingly, when the AP performs digital signal processing necessary for a hearing aid operation, the smartphone may be used as a hearing aid replacement. Particularly, in the AP, the CPU is responsible for an algorithm for relatively complicated determinations, and the GPU is relatively simple, but is responsible for parallel processing having many repetitive calculations, thereby being capable of greatly improving calculation speed.

That is, the time taken for digital signal processing necessary for a hearing aid operation according to the present invention can be significantly reduced using the GPU as the co-processor of the CPU. The digital signal processing necessary for the hearing aid operation includes beam forming, filter bank separation, wide dynamic range compression, and frequency equalization.

In the smartphone, however, quality of an output sound signal is limited although high performance signal processing, such as beamforming, is applied because the number of embedded microphones is commonly limited to 2 or 3. Furthermore, it is difficult to directly use the smartphone as a hearing aid replacement due to a disadvantage in that latency until a sound signal received by the microphone reaches the speaker embedded in the smartphone through the smartphone is long.

If latency until a sound signal received by the microphone reaches the speaker through the smartphone is long, quality of a sound signal is poor due to an interference phenomenon attributable to a latency difference between a sound signal directly transferred to a user's ear without the intervention of the smartphone and a sound signal transferred to the ear through the smartphone. Furthermore, the user feels inconvenient because the sound transferred to the ear through the smartphone is not temporally identical with a change in the shape of a counterpart's lip. In recent digital hearing aids, latency from timing in which a sound signal is received by a microphone attached to the hearing aid to timing in which the sound signal is output to the speaker of the hearing aid via a hearing aid circuit is maintained to a maximum of 10 ms or less. In this case, ms is a unit indicative of millisecond, and corresponds to $\frac{1}{1000}$ seconds.

In recent Android smartphones, latency is 200 ms or more. The reason for this is as follows. In the smartphone, in order to prevent an operation of the AP from being hindered while audio data is input or output, audio data is collected for each given unit, and the AP or the audio codec processes the audio data at once. The audio data processing unit of the smartphone is the number of samples of an audio signal processed by the AP or audio codec of the smartphone at once, and is very various, such as 64, 128, 256, 512, 1024, 240, 480, 960, and 1920. The sampling rate of an audio signal used in the smartphone is 44.1 kS/sec or 48.0 kS/sec. If the sampling rate is 48.0 kS/sec and the audio data processing unit is 240 samples, the smartphone collects audio data for 5 ms, and the AP processes the audio data by transmitting the audio data to the audio codec embedded in the smartphone at once every 5 ms.

As a value of the audio data processing unit increases, latency from timing in which an audio signal is received by the microphone to timing in which the audio signal is output to the speaker is increased. The reason for this is caused by a wait time in an input and output data buffer. If the sampling rate is 48.0 kS/sec and the audio data processing unit is 240 samples, the wait time in the input and output data buffer is a maximum of 10 ms. The wait time is calculated as follows. A wait time of a maximum of 5 ms is taken until the input data buffer of the audio codec is full of 240 samples after an audio signal is input to the microphone, amplified by the audio codec chip, and converted into a digital signal. Furthermore, a wait time of a maximum of 5 ms is further necessary to transmit and store data, corresponding to the 240 samples, in the output data buffer of the audio codec at once in order to output the audio signal to the speaker after the audio signal is processed by the smartphone and stored in the random access memory (RAM) of the smartphone.

Accordingly, if the sampling rate is 48 kS/sec and the audio data processing unit is 240 samples, maximum latency until an audio signal is output from the microphone to the speaker through the smartphone is 10 ms or more in which the time taken for the signal processing is added to the sum of 10 ms, that is, the input and output data buffer wait time. If the sampling rate is 48 kS/sec and the audio data processing unit is 1920 sample, the input and output data buffer wait time is 80 ms. If the time taken to process a signal and move data in the smartphone is added to the wait time of the input and output data buffer, latency until a sound signal input to the microphone of an Android smartphone is output to the speaker through the smartphone is commonly 200 ms or more. In such a case, the same sound is heard twice because a sound signal heard through the smartphone and a sound signal directly transferred to an ear are recognized as different sound signals, thereby causing inconvenience.

DISCLOSURE

Technical Problem

An object of the present invention is to provide a smartphone-based hearing aid, which can miniaturize the size, reduce expenses, and improve audio performance by connecting an analog interface unit configured with a single integrated circuit chip between a plurality of microphones and a smartphone without using a separate power supply device or digital signal processor.

Technical Solution

A smartphone-based hearing aid according to the present invention includes a microphone array configured with a plurality of microphones for converting a received sound signal into an electric signal and outputting the electric signal; an analog interface unit having a function for receiving a plurality of analog signals output by the microphone array, amplifying the analog signals, converting the amplified analog signals into respective digital signals, and outputting the digital signals to a smartphone and selectively having a function for converting a digital signal, received from the smartphone, into an analog signal and outputting the analog signal to a speaker; the smartphone performing signal processing necessary for a hearing aid operation on the digital signal received from the analog interface unit and outputting the signal-processed digital signal to the analog interface unit or converting the signal-processed digital signal into the analog signal and outputting the analog signal to the speaker; the speaker converting the analog signal, received from the analog interface unit or the smartphone, into a sound signal; a first connection device connecting the analog interface unit and the smartphone; a second connection device connecting the speaker to the smartphone or the analog interface unit; and a third connection device connecting the microphone array and the analog interface unit.

Advantageous Effects

The smartphone-based hearing aid according to the present invention has an advantage in that the price is low using elements, such as an AP, RAM, a digital-analog converter, a speaker, and a display embedded in a smartphone, without using a digital signal processing chip essentially used for the existing hearing aid or personal sound amplifier. Particularly, if a CPU and GPU embedded in the AP of a smartphone are used, digital signal processing necessary for a hearing aid operation can be performed within a short time of a millisecond (ms) unit using only software.

Furthermore, there is an effect in that a hearing aid having a small size, not requiring an additional battery, and having a low price and excellent audio performance can be implemented by connecting a single integrated circuit chip between a plurality of microphones and a smartphone to reinforce an insufficient audio signal processing ability of the smartphone.

MODE FOR INVENTION

Hereinafter, the present invention is described in detail with reference to the accompanying drawings.

Figure 1:
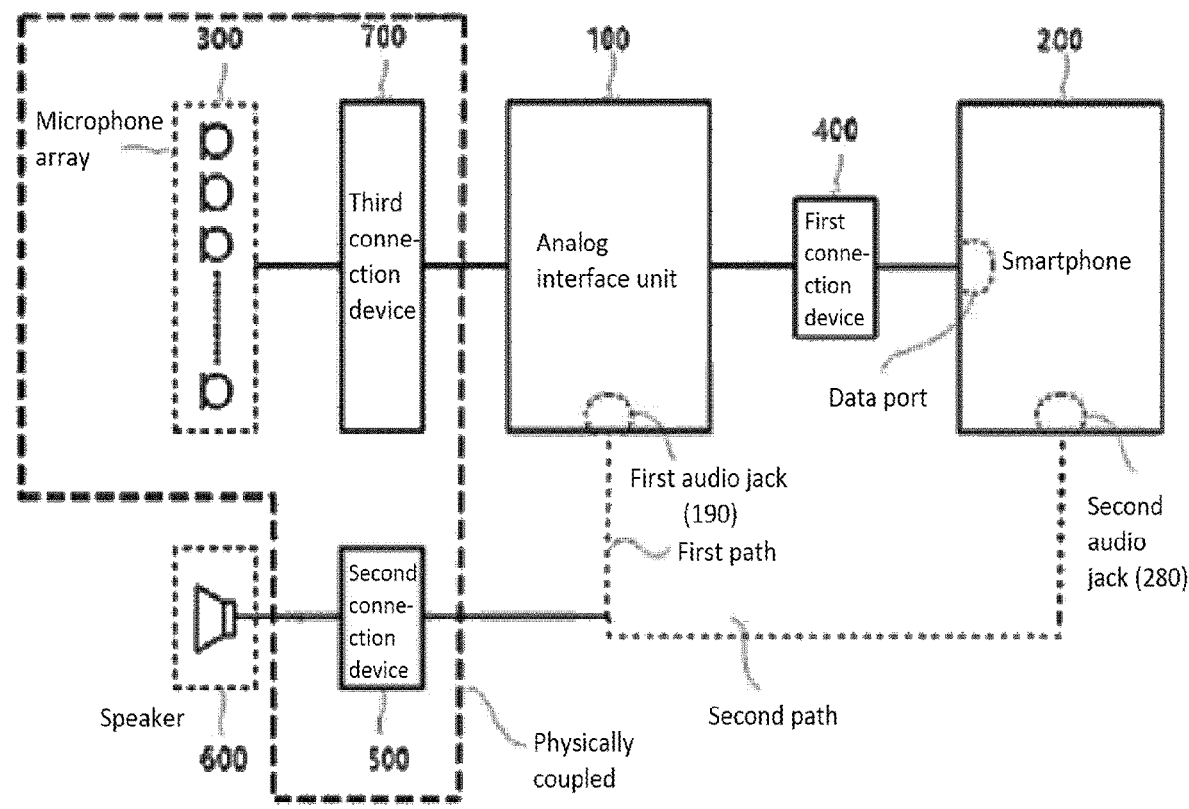
FIG. 1 is a diagram showing the configuration of a smartphone-based hearing aid according to the present invention.

FIG. 1 is a diagram showing the configuration of a smartphone-based hearing aid according to the present invention.

As shown in FIG. 1, the smartphone-based hearing aid according to an embodiment of the present invention is configured to include a microphone array 300, an analog interface unit 100, a smartphone 200, a speaker 600, a first connection device 400, a second connection device 500, and a third connection device 700.

The microphone array 300 is configured with a plurality of microphones for converting an externally received sound signal into an electric signal and outputting a plurality of analog signals. In an embodiment of the present invention, the number of microphones included in the microphone array 300 is 8, and each of the microphones may use a micro electro mechanical system (MEMS) microphone or an electret microphone.

The analog interface unit 100 has a function for receiving a plurality of analog signals output by the microphone array through the third connection device 700, amplifying the received analog signals, converting the signals into respective digital signals, and outputting the converted digital signals to the first connection device. The analog interface unit 100 may selectively have a function for receiving a digital signal from the first connection device 400, converting the digital signal into an analog signal, and outputting the analog signal to the speaker 600 through a first audio jack 190. In this case, the first audio jack 190 may be a 3.5 mm female audio jack.

The smartphone 200 has a function for performing signal processing necessary for a hearing aid operation on a digital signal received from the analog interface unit 100 through the first connection device 400, and selectively includes a function for converting the signal-processed digital signal into an analog signal and outputting the analog signal to a second audio jack 280 and a function for outputting the signal-processed digital signal to the analog interface unit 100 through the first connection device 400. In this case, the second audio jack 280 may be a 3.5 mm female audio jack.

The second connection device 500 selectively connects the speaker 600 to the first audio jack 190 of the analog interface unit 100 or the second audio jack 280 of the smartphone 200 so that an analog signal output to the first audio jack 190 or the second audio jack 280 is selectively converted into a sound signal and output through the speaker.

The speaker 600 is configured with two earphones disposed at the left and right ears of a hearing aid user.

Figure 2:
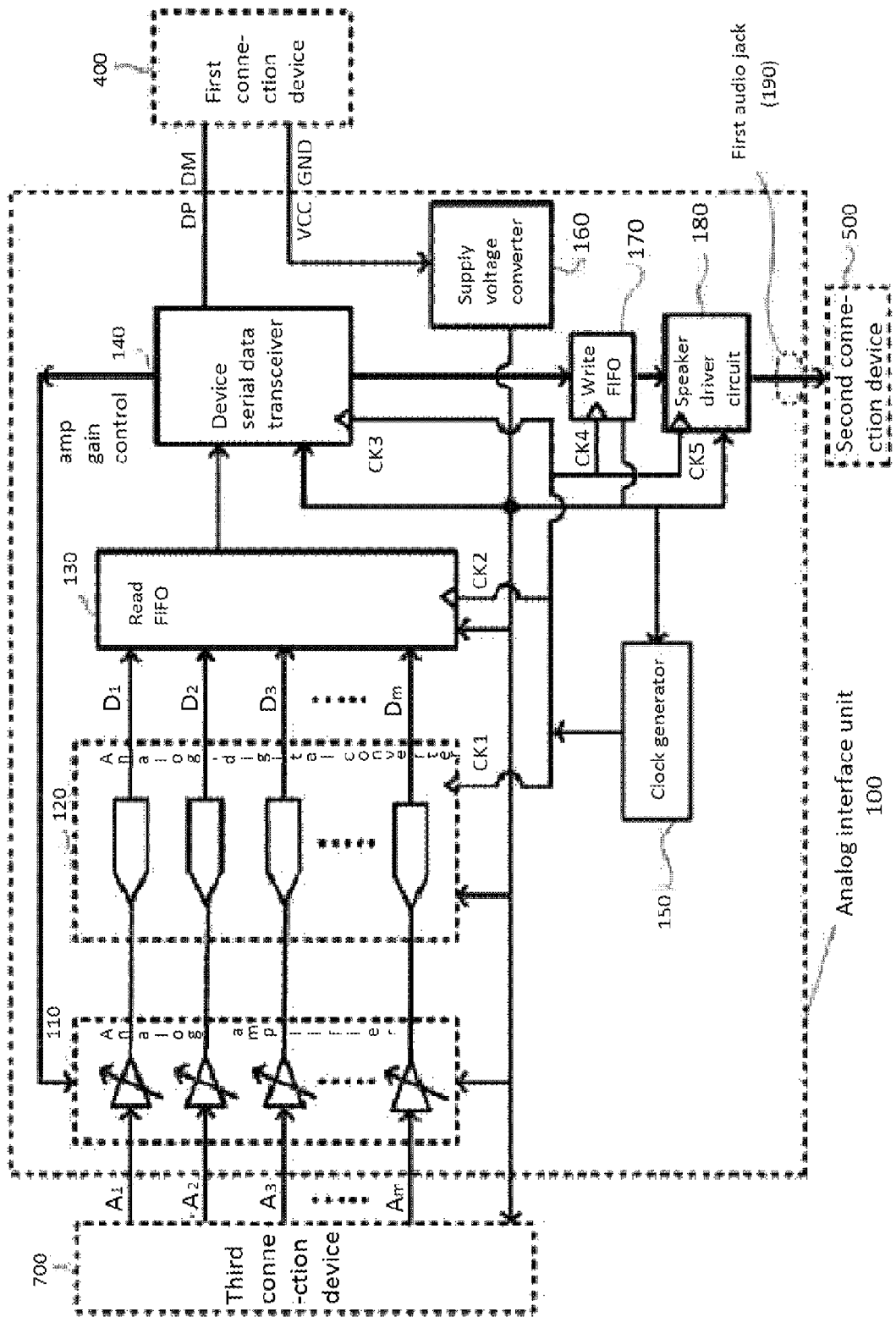
FIG. 2 is a diagram showing a detailed configuration of an analog interface unit included in the smartphone-based hearing aid according to an embodiment of the present invention.

FIG. 2 is a diagram showing a detailed configuration of an analog interface unit included in the smartphone-based hearing aid according to an embodiment of the present invention.

Referring to FIG. 2, the analog interface unit 100 is configured to include analog amplifiers 110, analog-digital converters 120, read FIFO memory 130, a device serial data transceiver 140, a clock generator 150, a supply voltage converter 160, write FIFO memory 170, and a speaker driver circuit 180.

The analog amplifiers 110 amplify a plurality of analog signals $A_1$, $A_2$, $A_3$, Am, respectively, received from the microphone array 300 through the third connection device 700, as much as an amp gain determined based on an amp gain control signal received from the device serial data transceiver 140, and outputs the amplified signals as different analog signals.

The analog-digital converters 120 receive the plurality of analog output signals of the analog amplifiers 110, convert the analog signals into respective digital signals, and output the digital signals.

The read FIFO memory 130 receives the digital output signals of the analog-digital converters 120 and outputs a single 8-bit or 16-bit parallel digital signal to the device serial data transceiver 140.

The device serial data transceiver 140 functions to receive the digital output signal of the read FIFO memory 130 and deliver it to the smartphone 200 through the first connection device 400, functions to receive an amp gain control signal to control the amp gain of the analog amplifier 110 from the smartphone 200 through the first connection device 400 and deliver the received amp gain control signal to the analog amplifier 110, and functions to receive a digital audio signal on which signal processing necessary for a hearing aid operation in the smartphone 200 has been completed from the smartphone 200 through the first connection device 400 and output the received digital audio signal to the write FIFO memory 170.

The write FIFO memory 170 outputs the digital audio signal, received from the device serial data transceiver 140, to the speaker driver circuit 180.

The speaker driver circuit 180 converts the digital audio signal, received from the write FIFO memory 170, into an analog signal, and outputs the analog signal to the first audio jack 190. The speaker driver circuit 180 is configured with an interpolation filter, a delta-sigma modulator, a class D amplifier, and an LC low pass filter.

The first audio jack 190 receives an analog signal output by the speaker driver circuit 180, and transfers the analog signal to the speaker 600 via the second connection device 500.

The clock generator 150 generates a first clock signal CK1 applied to the analog-digital converter 120, a second clock signal CK2 applied to the read FIFO memory 130, a third clock signal CK3 applied to the device serial data transceiver 140, a fourth clock signal CK4 applied to the write FIFO memory 170, and a fifth clock signal CK5 applied to the speaker driver circuit 180.

The supply voltage converter 160 is supplied with a DC voltage VCC from the smartphone 200 through the VCC and GND conducting wires of the first connection device 400, and generates supply voltages applied to the analog amplifiers 110, the analog-digital converters 120, the read FIFO memory 130, the device serial data transceiver 140, the write FIFO memory 170, the speaker driver circuit 180, the clock generator 150, and the third connection device 700, respectively.

In this case, all circuits configuring the analog interface unit 100 may be implemented in a single integrated circuit chip except an inductor (inducer) connected to the supply voltage converter 160, an oscillator (crystal) and a condenser, that is, a passive element, connected to the clock generator, an inductor and condenser included in the LC low pass filter of the speaker driver circuit, and some condensers and some resistors used for supply voltage stabilization.

In an embodiment of the present invention, each of the number of amplifiers included in the analog amplifier 110 and the number of analog-digital converters included in the analog-digital converter 120 is 8 identical with the number of microphones of the microphone array 300.

Furthermore, in an embodiment of the present invention, an Android smartphone is used as the smartphone 200, and a universal serial bus (USB) 1.1 transceiver used for Android phones is used as the device serial data transceiver 140. In relation to the smartphone 200 and the device serial data transceiver 140, the present invention may also be applied to the Apple's iPhone using a lightning port and a smartphone using a USB type-C port instead of the USB OTG data port used in an embodiment of the present invention.

The amp gain of the analog amplifier 110 is determined so that a maximum range of 8 output signals of the analog amplifiers does not exceed a convertible input voltage range of the analog-digital converter. To this end, when the output signal of the analog-digital converter is transferred to the smartphone through the read FIFO memory, the device serial data transceiver, and the first connection device, the AP of the smartphone may determine an amp gain control signal so that the 8 output signals of the analog amplifier is located within 10% and 90% of the convertible input voltage range of the analog-digital converter.

The amp gain control signal is applied to all the 8 analog amplifiers as one type of value, and thus the voltage gains of the 8 analog amplifiers are identically determined. In an embodiment of the present invention, the analog-digital converter 120 is configured to include a delta-sigma modulator and a decimation filter, and thus outputs a pulse code modulation (PCM) code, that is, common digital data.

The supply voltage converter 160 is supplied with a DC 5V voltage from the smartphone 200 through the first connection device 400, and generates supply voltages necessary for operations of all the circuits of the analog interface unit 100 and the microphone array 300. Accordingly, the hearing aid according to an embodiment of the present invention does not require an additional battery because it is supplied with all necessary DC voltages from the battery of the smartphone. Accordingly, a total size and price of the hearing aid according to an embodiment of the present invention can be reduced.

The first connection device 400 according to an embodiment of the present invention is configured with a USB OTG (on the go) connector 410 and a USB OTG cable 420, and it connects the data port of the smartphone and the analog interface unit. Each of The USB OTG connector 410 and the USB OTG cable 420 includes five conducting wires of DP, DM, VCC, GND, and ID. Bidirectional USB data communication is performed through the DP and DM conducting wires. A DC voltage is supplied from the smartphone to the analog interface unit through the VCC and GND conducting wires.

The ID conducting wire of the USB OTG cable is shorted with the GND conducting wire, so the smartphone operates as a host of USB communication. If the ID conducting wire is open without being connected to any conducting wire, the smartphone operates as a device of USB communication. In this case, the smartphone is applied when it is connected to a personal computer (PC) through the USB OTG cable.

The supply voltage converter 160 includes a DC-DC converter for efficiently generating 3.3V and 1.8V DC supply voltages necessary for the analog amplifier 110, the analog-digital converter 120, the read FIFO memory 130, the device serial data transceiver 140, the write FIFO memory 170, the speaker driver circuit 180, the clock generator 150, and the third connection device 700, using a 5V DC voltage received from the smartphone 200 through the first connection device 400.

The DC-DC converter requires an inductor (inducer). The clock generator 150 uses an oscillator (crystal) in order to generate an accurate clock signal necessary for operations of the analog-digital converter, the read FIFO memory, the device serial data transceiver, the write FIFO memory 170, and the speaker driver circuit 180. In an embodiment of the present invention, the clock generator 150 generates the first clock signal CK1 necessary for the analog-digital converter, the second clock signal CK2 necessary for the read FIFO memory, the third clock signal CK3 necessary for the device serial data transceiver, the fourth clock signal CK4 necessary for the write FIFO memory 170, and the fifth clock signal CK5 necessary for the speaker driver circuit 180, using a 60 M Hz oscillator.

Figure 3:
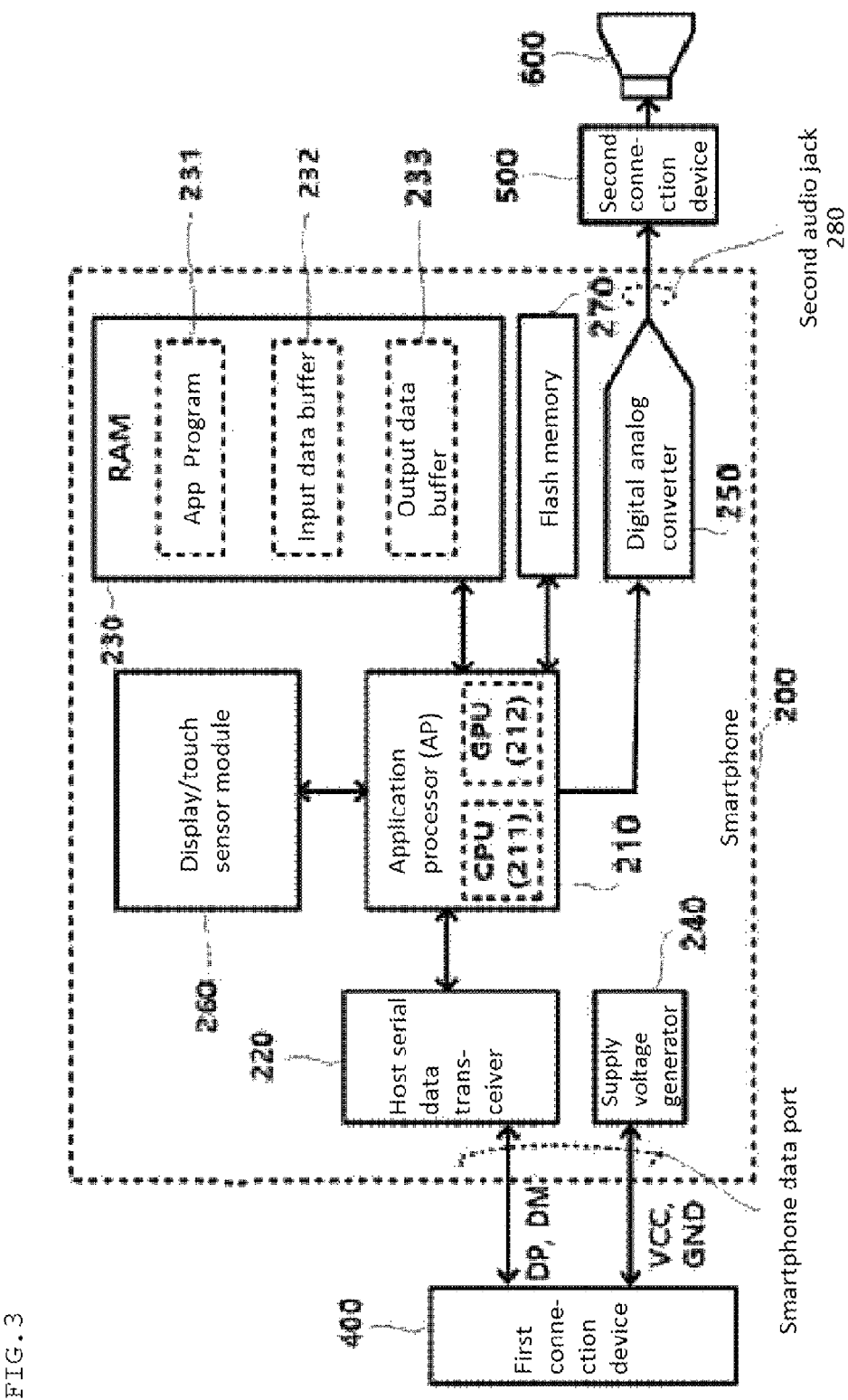
FIG. 3 is a diagram showing a detailed configuration of elements of a smartphone used for the smartphone-based hearing aid according to an embodiment of the present invention.

FIG. 3 is a diagram showing a detailed configuration of elements of the smartphone used for the smartphone-based hearing aid according to an embodiment of the present invention.

The smartphone 200 included in the smartphone-based hearing aid according to an embodiment of the present invention includes an application processor (AP) 210 including a central processing unit (CPU) and a graphic processing unit (GPU), a host serial data transceiver 220 connecting the AP 210 and the first connection device 400 through the data port of the smartphone, RAM 230 connected to the AP 210, a display/touch sensor module 260 connected to the AP 210, a digital-analog converter 250 connecting the AP 210 and the second audio jack 280, a supply voltage generator 240 generating a DC supply voltage and supplying it to the first connection device 400, and flash memory 270.

The second audio jack 280 output the output signal of the digital-analog converter 250 to the speaker 600 through the second connection device 500.

The data port of the smartphone is chiefly used to connect a cable for charging in order to charge the smartphone or to connect a data communication cable in order to perform data communication with the smartphone, a PC, a USB memory stick or a USB dongle. In an embodiment of the present invention, the data port of the smartphone is used for two purposes. One is to perform data communication between the smartphone 200 and the analog interface unit 100, and the other is to receive power from the smartphone to the analog interface unit 100.

DC power necessary for the analog interface unit 100 and the microphone array 300 is supplied by the smartphone through the data port of the smartphone. Recently, an Android smartphone uses a 5-pin micro USB OTG (on the go) data port, and an Apple's smartphone uses an 8-pin lightning data port. In both the smartphones, a DC voltage is supplied from the smartphone to an external device through the data port. A USB type C connector that recently starts to be used as the data port of the smartphone, that is, an upper and lower symmetry structure, uses 24 pins, and has been regulated in the specification to supply a current of 1000 mA to an external device through a DC voltage of 5 V.

The micro USB OTG data port is configured with 5 pins of DP, DM, VCC, GND, and ID. A current of up to 100 mA may be supplied from the smartphone to an external device through the VCC and GND pins using a DC voltage of 5 V.

The host serial data transceiver 220 is chiefly responsible for bidirectional data communication between the smartphone 200 and the analog interface unit 100 through the data port of the smartphone and the first connection device 400.

The supply voltage generator 240 generates a DC voltage to be supplied to the analog interface unit 100 and the microphone array 300 through the data port and the first connection device 400. A maximum current that may be supplied by the supply voltage generator 240 should be 100 mA or more.

The display/touch sensor module 260 is connected to the AP 210 and is responsible for a graphic user interface (GUI).

The RAM 230 includes app program storage 231 for storing an app program executed in the AP 210, an input data buffer 232 for storing data transferred from the analog interface unit 100 to the smartphone 200 through the first connection device 400, and an output data buffer 233 for storing data to be output to the write FIFO memory 170 of the analog interface unit 100 or the digital-analog converter 250.

The app program storage 231 is a block of the RAM 230 for storing an app program (smartphone app program), that is, a program executed in the AP 210, in order to drive the hearing aid according to the present invention.

The app program includes a driver program for driving the host serial data transceiver 220, the display/touch sensor module 260, and the digital-analog converter 250, an amp gain determination program for calculating an amp gain value of the analog amplifier 110, and a digital signal processing program for performing digital signal processing necessary for a hearing aid operation on data read from the input data buffer 232 and storing corresponding resulting data in the output data buffer 233.

The input data buffer 232 is a block of the RAM 230 for storing data transferred from the analog interface unit 100 to the smartphone 200 through the first connection device 400. The output data buffer 233 is a block of the RAM 230 for data to be output from the AP 210 to the analog interface unit 100 or the digital-analog converter 250.

If data is output from the output data buffer to the analog interface unit, the data is output to the speaker sequentially via the host serial data transceiver 220, the first connection device 400, the device serial data transceiver 140, the write FIFO memory 170, the speaker driver circuit 180, the first audio jack 190, and the second connection device 500.

If data is output from the output data buffer to the digital-analog converter 250, the data is output to the speaker 600 sequentially via the digital-analog converter (DAC) 250, the second audio jack 280, and the second connection device 500.

The flash memory 270 high-capacity memory, and store coefficient values necessary for the digital signal processing program and a look up table (LUT).

The digital-analog converter 250 is a DAC commonly embedded in the audio codec chip of the smartphone. If data is output from the output data buffer to the digital-analog converter, when the AP reads digital data from the output data buffer 233 of the RAM and outputs the digital data to the DAC, the DAC converts the received digital data into an analog signal and outputs the analog signal to the speaker 600 through the second connection device 500.

In an embodiment of the present invention, the second connection device 500 is configured with one third audio jack 520 and an audio cable 510. In this case, the third audio jack 520 may be a 3.5 mm male audio jack.

The third audio jack 520 is selectively connected to the second audio jack 280 of the smartphone 200 or the first audio jack 190 of the analog interface unit 100. The other side of the audio cable is connected to two earphones disposed at both ears of a user.

In this case, the speaker 600 may be configured with the earphones.

The second connection device 500 may be configured with a Bluetooth radio connection. In this case, since latency according to the Bluetooth radio connection is long, latency until a signal received by the microphone array 300 reaches the speaker 600 sequentially through the third connection device 700, the analog interface unit 100, the first connection device 400, the smartphone 200, and the second connection device 500 may be greater than 20 ms (0.02 second), that is, a target in the present invention.

The smartphone-based hearing aid according to the present invention may have latency of 0.02 sec or less. In an embodiment of the present invention, when the third audio jack 520 configuring the second connection device 200 is connected to the second audio jack 280 of the smartphone 200, latency is maintained within 0.02 second. When the third audio jack 520 is connected to the first audio jack 190 of the analog interface unit 100, latency is maintained within 0.014 second.

Figure 4:
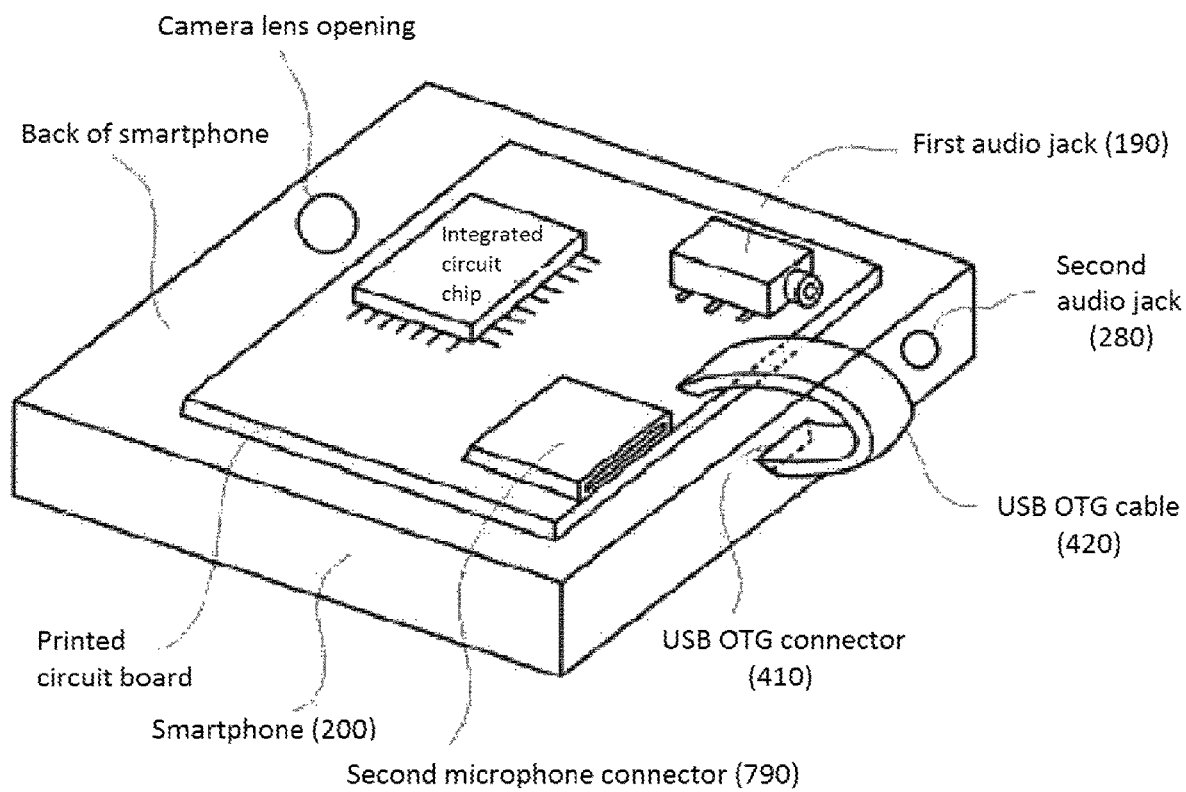
FIG. 4 is a diagram showing a detailed configuration when the analog interface unit of the smartphone-based hearing aid according to an embodiment of the present invention is fixed to the back of the smartphone.

FIG. 4 is a diagram showing a detailed configuration when the analog interface unit of the smartphone-based hearing aid according to an embodiment of the present invention is fixed to the back of the smartphone.

Referring to FIG. 4, one integrated circuit chip; one first audio jack 190; one second microphone connector 790; one USB OTG cable 420; and some passive elements (resistor, condenser, inductor, crystal for oscillation) are mounted on a single printed circuit board.

The one integrated circuit chip includes all circuits except some passive elements, from among the circuits configuring the analog interface unit 100 of FIG. 2. That is, all circuits except passive elements, including an inductor and resistor used for the supply voltage converter 160, one crystal for oscillation used for the clock generator 150, and an inductor and condenser used for the speaker driver circuit 180, from among the analog amplifier 110, the analog-digital converter 120, the read FIFO memory 130, the device serial data transceiver 140, the write FIFO memory 170, the speaker driver circuit 180, the supply voltage converter 160, and the clock generator 150, are implemented within the single integrated circuit chip.

The first audio jack 190 attached to the printed circuit board is selectively connected to the second connection device 500, and transfers an analog signal, generated by the integrated circuit chip, to the speaker 600 through the second connection device.

The USB OTG cable 420 attached to the printed circuit board connects the integrated circuit chip to the smartphone 200 through the data port of the smartphone, along with the USB OTG connector 410 configuring the first connection device 400, and it functions to receive an analog signal generated by the microphone array 300 from the integrated circuit chip and to deliver a digitally converted signal from the integrated circuit chip to the smartphone.

Furthermore, the first connection device functions to complete signal processing necessary for a hearing aid operation in the smartphone through software with respect to a digital signal received from the integrated circuit chip and to deliver a resulting digital signal from the smartphone to the integrated circuit chip, functions to calculate an amp gain value necessary to adjust an output voltage range of the analog amplifier 110 of the integrated circuit chip to an input voltage range of the analog-digital converter 120 of the integrated circuit chip in the smartphone, functions to deliver the calculated amp gain value from the smartphone to the integrated circuit chip, and functions to deliver a DC supply voltage, generated by the smartphone, to the integrated circuit chip.

The second microphone connector 790 attached to the integrated circuit chip is part of the third connection device 700, and functions to deliver a plurality of analog signals, generated by the microphone array 300, from the microphone array to the integrated circuit chip.

If the single printed circuit board on which the one integrated circuit chip, the one first audio jack 190, the one second microphone connector 790, the one USB OTG cable 420 and some passive elements (resistor, condenser, inductor, crystal for oscillation) shown in FIG. 4 are mounted is to be mounted within a single casing, it is expected that the size of the casing will not exceed 65 mm in width, 65 mm in length, and 10 mm in height by taking into consideration the size of the integrated circuit chip, the audio jack and the connector.

The casing having the printed circuit board mounted therein is positioned on the back of the smartphone, which is opposite a screen of the smartphone 200, and the casing is directly fixed to the back of the smartphone or physically fixed to the outside of the casing of the smartphone positioned at the back of the smartphone, thereby being capable of minimizing inconvenience occurring due to the casing when a user uses the smartphone.

Figure 5:
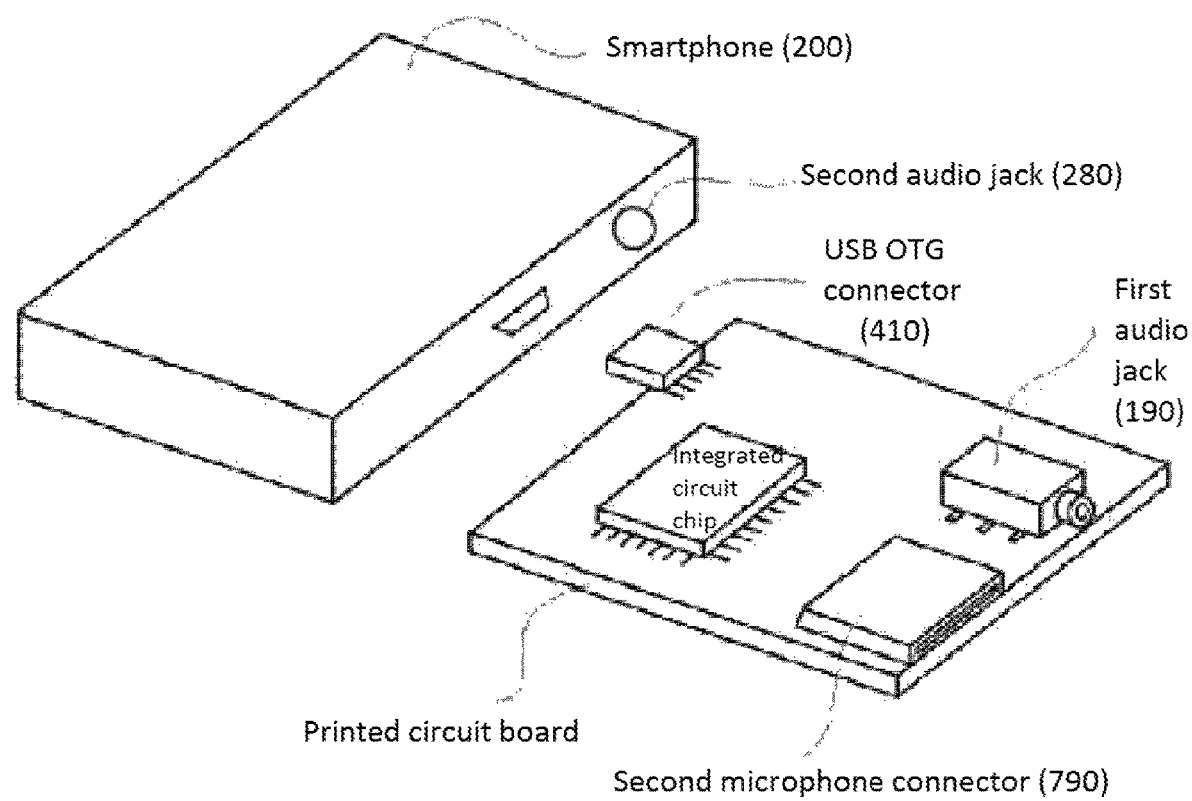
FIG. 5 is a diagram showing a detailed configuration when the analog interface unit of the smartphone-based hearing aid according to an embodiment of the present invention is fabricated in a dongle form and connected to the data port of a smartphone.

FIG. 5 is a diagram showing a detailed configuration when the analog interface unit of the smartphone-based hearing aid according to an embodiment of the present invention is fabricated in a dongle form and connected to the data port of a smartphone.

Referring to FIG. 5, there is an advantage in that the size is smaller than that of the casing of FIG. 4 because the USB OTG cable 420 configuring the first connection device 400 is not present compared to FIG. 4, but there is a disadvantage in that the length of both the smartphone and the dongle is increased.

Figure 6:
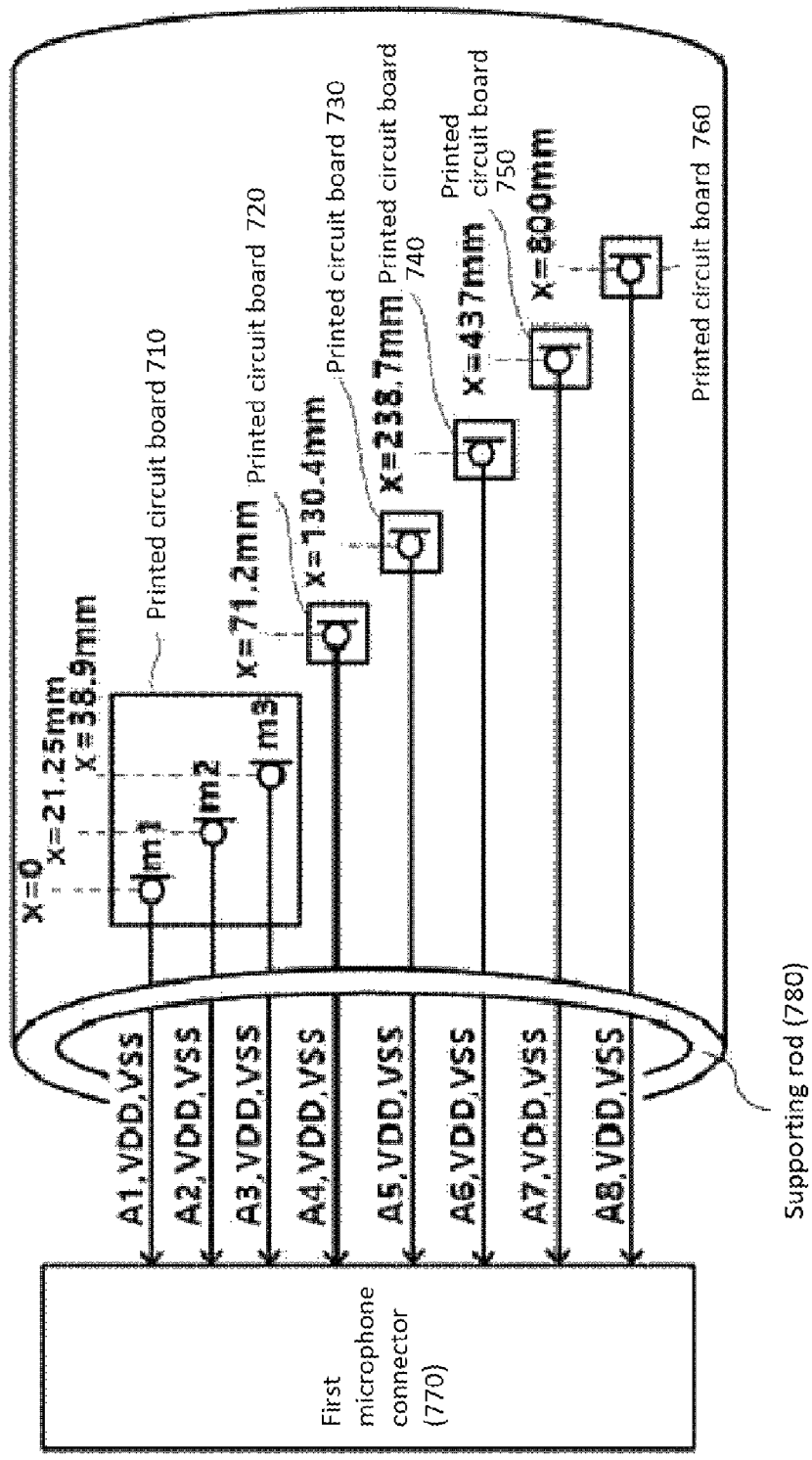
FIG. 6 is a diagram showing a detailed configuration of a third connection device according to an embodiment of the present invention.

FIG. 6 is a diagram showing a detailed configuration of the third connection device 700 according to an embodiment of the present invention.

Referring to FIG. 6, the third connection device 700 is configured with a plurality of printed circuit boards 710, 720, 730, 740, 750, and 760; a plurality of conducting wires; a first microphone connector 770; one supporting rod 780; and a second microphone connector 790 not shown in FIG. 6. The third connection device transfers analog signals A1, A2, A3, A4, A5, A6, A7, and A8, generated by the microphone array 300, to the analog interface unit 100. The second microphone connector 790 is positioned on the printed circuit board of FIG. 4 along with the integrated circuit chip that implements the analog interface unit 100, and is connected to the first microphone connector 770 as a female-male connector relation. One or a plurality of microphones is attached to a surface of each of the plurality of printed circuit boards configuring the third connection device. Each of the printed circuit boards is electrically connected to the first microphone connector 770 through a plurality of conducting wires. Each microphone attached to the surface of the printed circuit board is connected to the first microphone connector 770 through three conducting wires of VDD, VSS, and Am. The Am is the analog output signal terminal of the microphone. The one supporting rod 780 is a rod having a hollow pipe form, and is made of a material that is well bent. The plurality of printed circuit boards to which the microphones have been attached and the plurality of conducting wires are disposed in the empty space inside the supporting rod, functioning to mechanically support and protect the plurality of microphones, the plurality of printed circuit boards, and the plurality of conducting wires.

Figure 7:
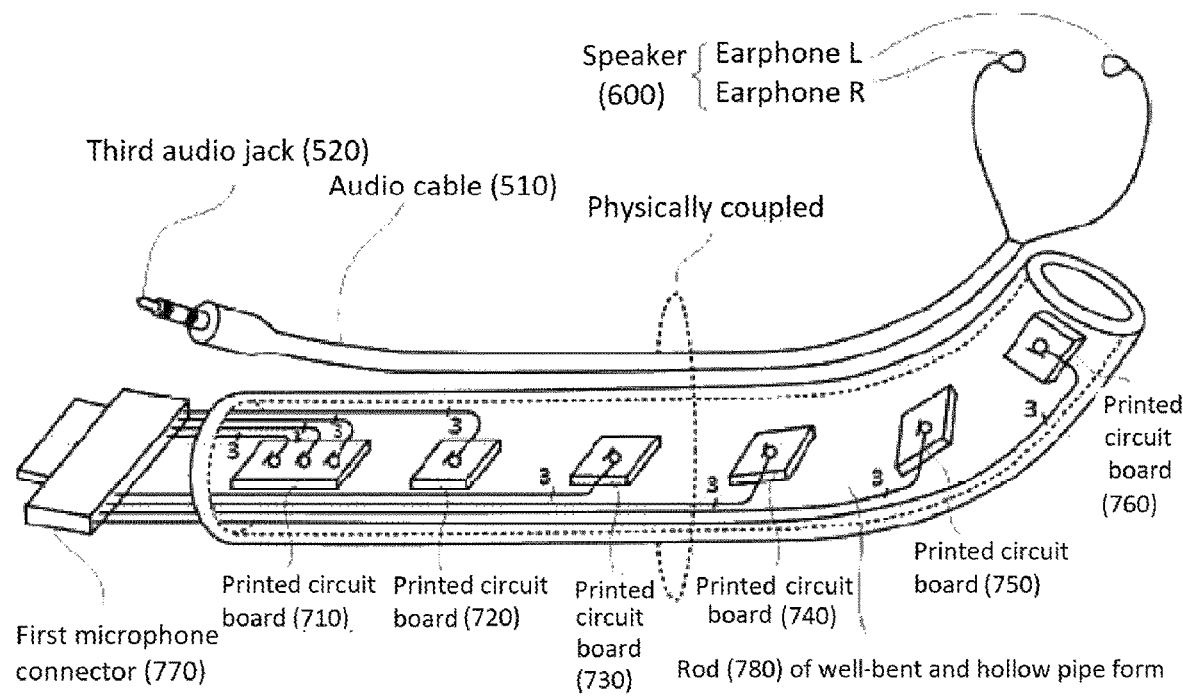
FIG. 7 is a diagram showing the deployment and detailed configuration of a second connection device, a speaker, and a third connection device according to an embodiment of the present invention.

FIG. 7 is a diagram showing the deployment and detailed configuration of the second connection device 500, the speaker 600, and the third connection device 700 according to an embodiment of the present invention.

Referring to FIG. 7, the third connection device 700 connected to a plurality of microphones is physically connected to a large portion of the second connection device 500. More specifically, the supporting rod 780 configuring the third connection device 700 and the audio cable 510 configuring the second connection device 500 are closely disposed in parallel and are physically coupled at a plurality of locations. Due to the physical coupling, if a user uses the hearing aid according to the present invention, when the user connects the third audio jack 520 configuring the second connection device 500 to the first audio jack 190 or the second audio jack 280 positioned in the analog interface unit 100 or the smartphone 200 and positions the speaker 600 configured with the two earphones attached to the second connection device 500 at the ears of the user, the supporting rod 780 configuring the third connection device 700 maintains an almost straight-line form, so the plurality of microphones coupled to the third connection device is isolated and disposed close at predetermined intervals shown in FIG. 6 as an x value. An air hole is perforated at each of the points of the supporting rod 780 at which the plurality of microphones is disposed so that an input sound signal is well transferred to the plurality of microphones.

Figure 8:
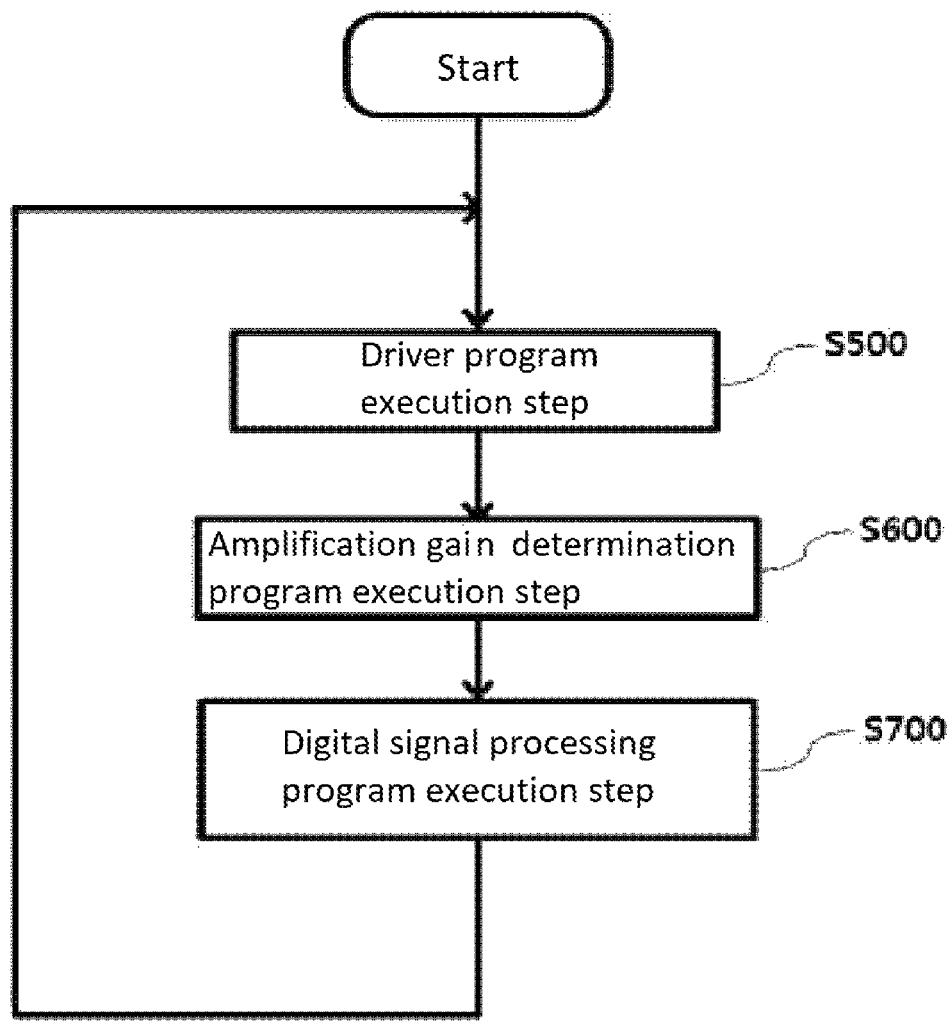
FIG. 8 is a flowchart of the smartphone app program of a smartphone included in the smartphone-based hearing aid according to an embodiment of the present invention.

FIG. 8 is a flowchart of the smartphone app program of the smartphone included in the smartphone-based hearing aid according to an embodiment of the present invention.

The smartphone app program is performed in order of a driver program execution step S500, an amplification gain determination program execution step S600, and a digital signal processing program execution step S700 necessary for a hearing aid operation, which are continuously repeated in this sequence.

Figure 9:
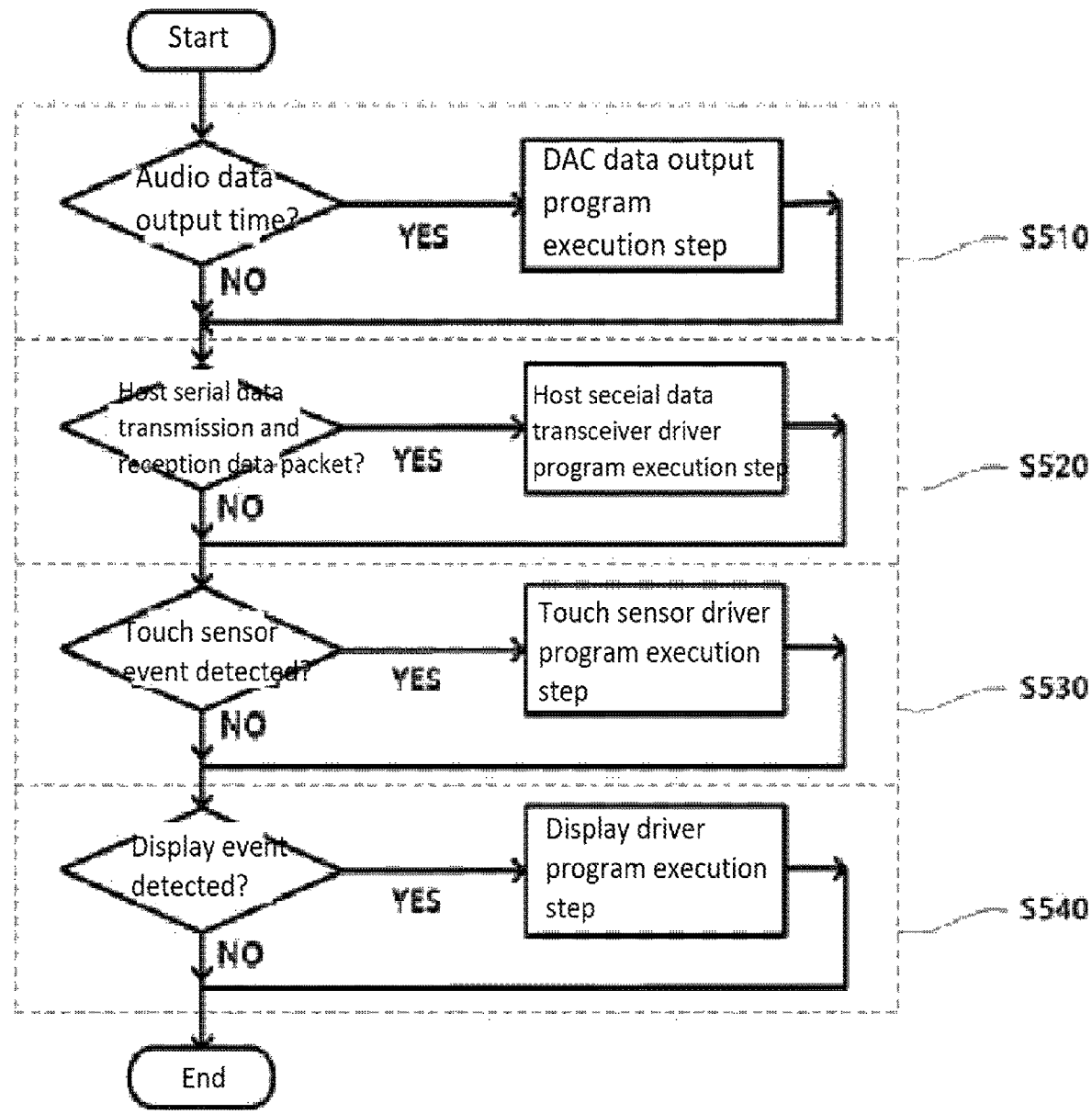
FIG. 9 is a detailed flowchart of a driver program execution step of FIG. 8.

FIG. 9 is a detailed flowchart of the driver program execution step of FIG. 8.

In the driver program execution step S500, a function of driving the host serial data transceiver 220, the digital-analog converter 250, and the display/touch sensor module 260 is performed.

As shown in FIG. 9, the driver program execution step S500 is performed in order of a DAC data output program execution step S510 of controlling an operation of the digital-analog converter 250, a host serial data transceiver driver program execution step S520 of controlling an operation of the host serial data transceiver 220, a touch sensor driver program execution step S530, and a display driver program execution step S540.

Detailed contents of the host serial data transceiver driver program execution step S520 are as follows.

In an embodiment of the present invention, a universal serial bus (USB) 1.1 data transmission and reception standard is used for the host serial data transmission and reception and device serial data transmission and reception. All spirits proposed in the present invention may be applied to a case where serial data transmission and reception of another method are used. A transmission method using the USB 1.1 standard has a lower maximum data transfer rate than a transmission method using the USB 2.0 standard, but has an advantage in that it has low power consumption. In order to realize a real-time hearing aid and a personal sound amplifier operation, an isochronous transfer method of USB data transmission methods is adopted.

Accordingly, a real-time operation is possible because a predetermined amount of data is essentially transmitted every frame regulated in the USB interface standard. One frame time is 1 msec in the USB 1.1 standard. In an embodiment of the present invention, for one frame time of 1 ms, data of 768 bytes is transmitted from the analog interface unit 100 to the smartphone 200, and data of 192 bytes is transmitted from the smartphone to the analog interface unit. Accordingly, in an embodiment of the present invention, if a real-time operation is to be possible, data of 960 bytes in both directions must be transmitted during one frame time of 1 ms according to the USB 1.1 interface method.

The reason why the data of 768 bytes must be transmitted from the analog interface unit 100 to the smartphone 200 every 1 millisecond (ms) for a real-time operation is that analog signals output by the 8 microphones must be sampled 48,000 times per second (48 kS/sec) and all the sampled analog signals, each one having data of 16 bits (2 bytes) digitally converted from each analog signal, must be transmitted for a predetermined time.

Furthermore, the reason why the data of 192 bytes must be transmitted from the smartphone 200 to the analog interface unit 100 every 1 ms is that stereo data of 48 kS/sec on which signal processing necessary for a hearing aid operation has been completed in the smartphone must be transmitted to the analog interface unit.

The data of 768 bytes and 192 bytes transmitted in both directions must be transmitted through one USB communication channel during one frame time of 1 ms. In an embodiment of the present invention, the amount of data needed to be transmitted during one frame time of 1 ms through the USB communication channel is calculated according to Equation 1 below.

Amount of data needed to be transmitted during one subframe time of 1 ms for real-time operation=48 S/ms×(8 mic in +2 stereo out)×2 bytes/sec=960 bytes/ms. [Equation 1]

If an isochronous transmission method is adopted in the USB 1.1 standard and the amount of data (payload) transmitted through one data packet is determined to be 32 bytes, up to 36 data packets may be transmitted during one frame time of 1 ms. In this case, in an embodiment of the present invention, if 30 32-byte data packets are transmitted during one frame time of 1 ms, a real-time operation is possible because all the 960 bytes are transmitted.

If data is transmitted from the analog interface unit 100 to the smartphone 200 during the bidirectional data transmission, 8 analog-digital converter output data stored in the read FIFO memory 130 is stored in the input data buffer 232 of the RAM 230 sequentially through the device serial data transceiver 140, the first connection device 400, the host serial data transceiver 220, and the AP 210.

If data is transmitted from the smartphone to the analog interface unit during the bidirectional data transmission, data stored in the output data buffer 233 of the RAM 230 is stored in the write FIFO memory 170 sequentially through the AP 210, the host serial data transceiver 220, the first connection device 400, and the device serial data transceiver 140.

In an embodiment of the present invention, when the third audio jack 520 of the second connection device 500 is connected to the second audio jack 280 of the smartphone 200, the following operation is performed.

In the smartphone, after audio data is collected in the memory buffer in a given unit, the AP or the audio codec processes the audio data at once. In an embodiment of the present invention, the sampling rate of an audio signal is 48 kS/sec and the processing unit of audio data processed by the smartphone at once is 240 samples. Accordingly, data of 240 samples is output at once when an audio signal is output to the speaker using the digital-analog converter (DAC) of the audio codec chip embedded in the smartphone.

In such a case, a sound signal is output using the DAC of the audio codec chip embedded in the smartphone 200. Accordingly, when the AP 210 of FIG. 3 transmits data to the input data buffer 232 and output data buffer 233 of the RAM 230, the data is transmitted as much as 240 samples (480 bytes) at once, and data processing is also divided and performed in a 240-sample unit.

In such a case, in FIG. 9, the DAC data output program outputs audio data at once every 5 ms. Accordingly, when the audio data output timing is reached, data of 240 samples is output to the digital-analog converter 250 of the audio codec (S510). If the audio data output timing is not reached, the process proceeds to a next step. When data of a packet unit to be transmitted and received through the first connection device 400 is generated, the host serial data transceiver driver program is performed (S520). If not, the touch sensor driver program is performed when a touch sensor input signal is detected according to a graphic user interface (GUI) (S530). If there is no touch sensor input signal, whether there are contents to be newly displayed is checked. If there are contents to be newly displayed, the display driver program is performed (S540).

In an embodiment of the present invention, when the third audio jack 520 of the second connection device 500 is connected to the first audio jack 190 of the analog interface unit 100, step S520 of FIG. 9 is started by skipping step S510.

In this case, in step S520, signal processing necessary for a hearing aid operation is completed in the smartphone 200. Data stored in the output data buffer 233 of the RAM 230 is output to the speaker 600 sequentially through the AP 210, the host serial data transceiver 220, the first connection device 400, the device serial data transceiver 140, the write FIFO memory 170, the speaker driver circuit 180, the first audio jack 190, and the second connection device 550.

If the third audio jack 520 is connected to the first audio jack 190 as described above, unlike in the case where the third audio jack 520 is connected to the second audio jack 280, latency until an audio signal is received by the microphone array 300 and output to the speaker 600 through the hearing aid of the present invention is significantly reduced because there is no wait time (5 ms) until audio data is collected as much as the processing unit (240 samples).

Figure 10:
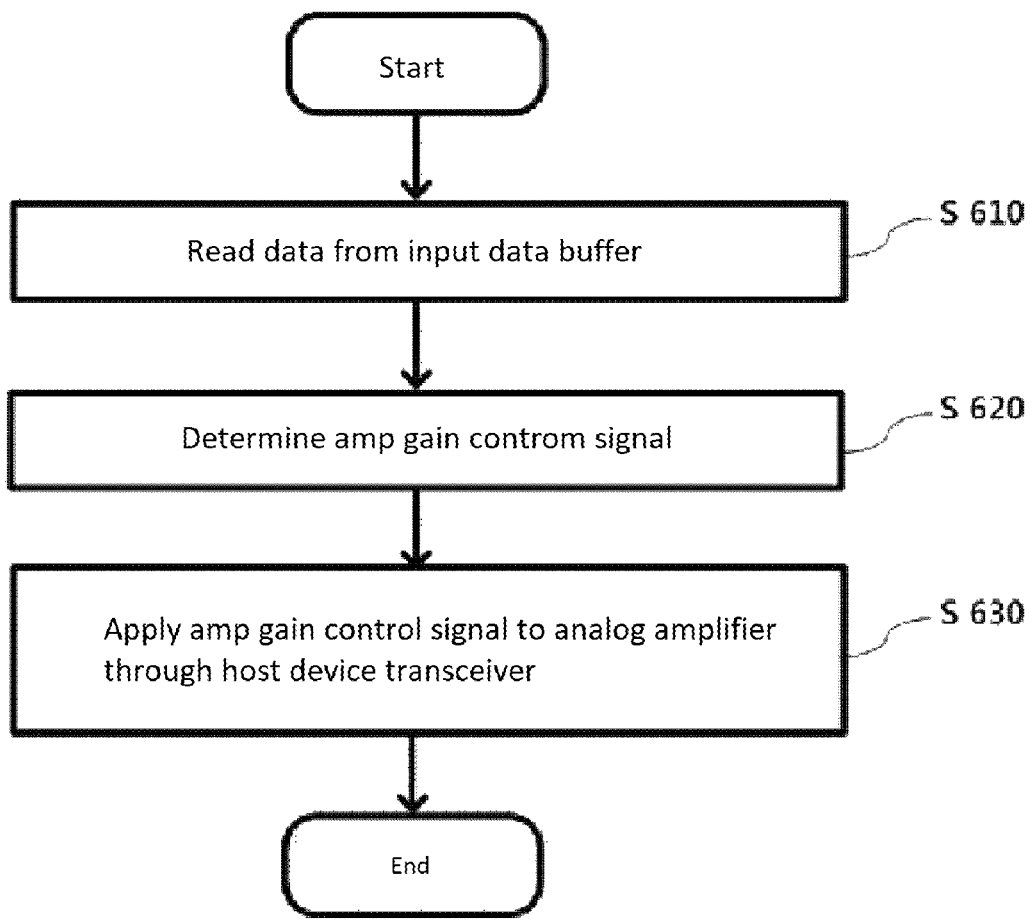
FIG. 10 is a flowchart of an amplification gain determination program execution step of FIG. 8.

FIG. 10 is a flowchart of the amplification gain determination program execution step of FIG. 8.

In the amplification gain determination program execution step S600, the amp gain value of the analog amplifier 110 shown in FIG. 2 is determined. The plurality of analog input signals A1, A2, A3, A4, A5, A6, A7, and A8 output by the microphone array 300 configured with the plurality of microphones of FIG. 1 is separately stored in the input data buffer 232 of the RAM 230 for each microphone sequentially through the analog amplifier 110, analog-digital converter 120, read FIFO memory 130, and device serial data transceiver 140 of FIG. 2 and the first connection device 400, host serial data transceiver 220, and AP 210 of FIG. 3.

First, data stored in the input data buffer 232 of the RAM 230 is read (S610). A gain value of the analog amplifier is determined so that a minimum value and maximum value of a digital signal corresponding to the output of each microphone are distributed in a very wide area not a narrow area of the analog-digital converter input range (S620).

If resolution of the analog-digital converter is 16 bits, the amp gain of the analog amplifier is calibrated so that a minimum value and maximum value of a value stored in the input data buffer becomes closer to hexadecimal x2000 (decimal number 8,192) and hexadecimal xE000 (decimal number 57,344) as much as possible with respect to all the microphones. In this case, all the amp gain values of the plurality of analog amplifiers become the same value. The determined amp gain value of the analog amplifier is applied to the analog amplifier 110 as an amp gain control signal through the AP 210, host serial data transceiver 220, and first connection device 400 of FIG. 3 and the device serial data transceiver 140 of FIG. 2 (S630).

Figure 11:
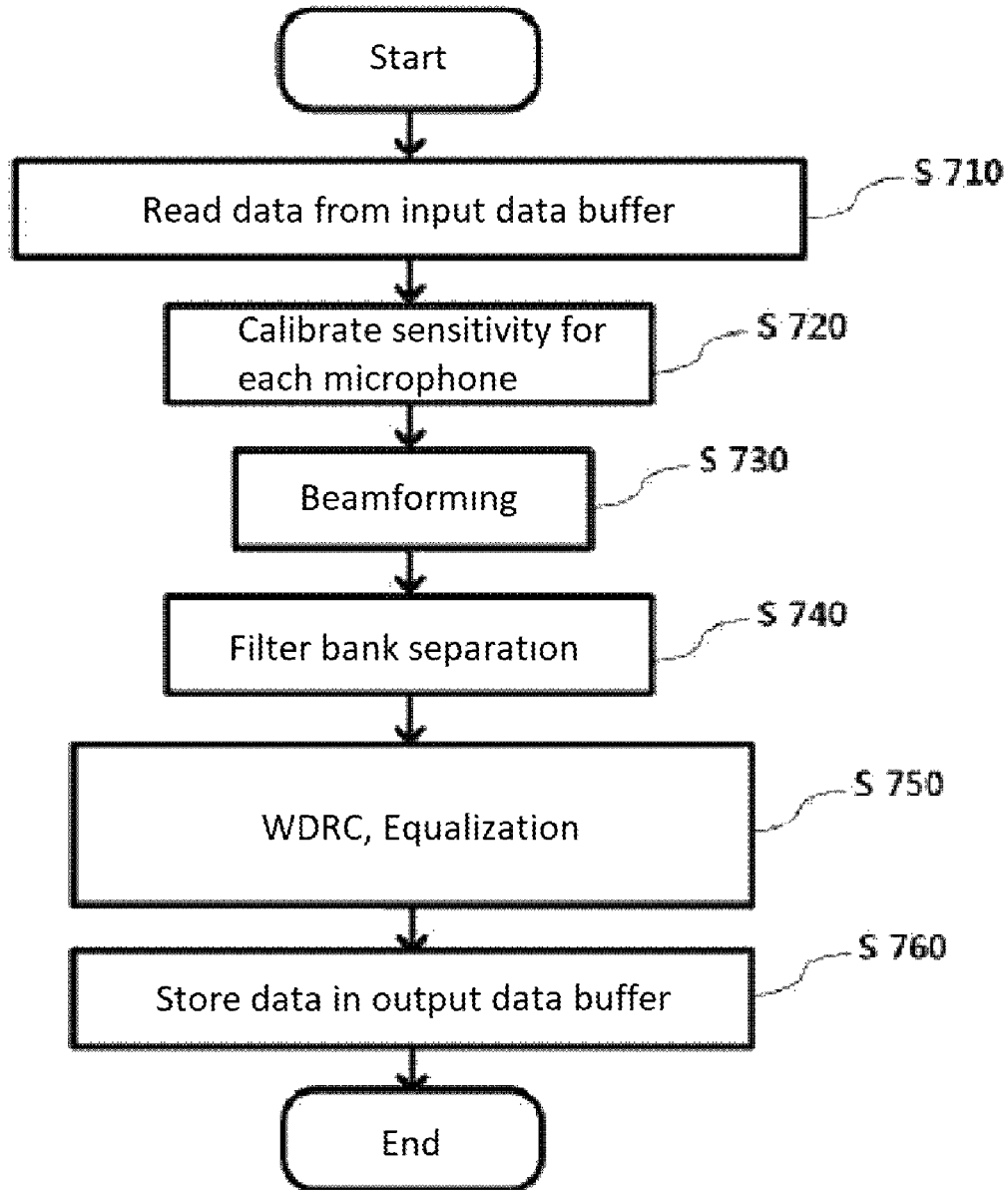
FIG. 11 is a detailed flowchart of a digital signal processing program execution step of FIG. 8.

FIG. 11 is a detailed flowchart of the digital signal processing program execution step S700 of FIG. 8.

First, data stored in the input data buffer 232 for each microphone is read (S710). A difference between the sensitivities of the microphones is calibrated (S720).

To this end, a value stored in the input data buffer is calibrated so that all the power values of an output signal during a given time become the same for each microphone with respect to the plurality of microphones (S720).

Next, a single data signal is generated by performing a beamforming operation based on the input data value calibrated with respect to the plurality of microphone signals (S730).

The beamforming operation is performed so that only a sound signal propagated in a specific direction is well heard. For example, through the beamforming operation, a sound signal generated in front of a user is well heard, and a sound signal generated on the side or back of the user is rarely heard. Next, the single data signal generated by the beamforming operation is separated into a plurality of filter bank signals of a narrow frequency band (narrow band channel signals) having neighboring frequency bands by performing a filter bank separation operation on the single data signal (S740).

In an embodiment of the present invention, 11 filter bank signals are generated. The band widths of the filter bank signals include 147~212.5 Hz, 212.5~289 Hz, 289~418 Hz, 418~605 Hz, 605~875 Hz, 875~1265 Hz, 1265~1829 Hz, 1829~2645 Hz, 2645~3825 Hz, 3825~5532 Hz, and 5532~8000 Hz, respectively.

After the single data signal is separated into the filter bank signals, a wide dynamic range compression (WDRC) operation and equalization operation necessary for hearing aid and personal sound amplifier operations are performed on each of the filter bank signals (S750). A single signal is generated by adding the resulting data of the 11 filter bank signals, and is stored in the output data buffer 233 of the RAM 230 (S760).

Coefficients for the filter bank separation and beamforming operation, a lookup table (LUT) for the WDRC operation, and coefficients for the frequency equalization operation are stored in the flash memory 270 of FIG. 3.

Figure 12:
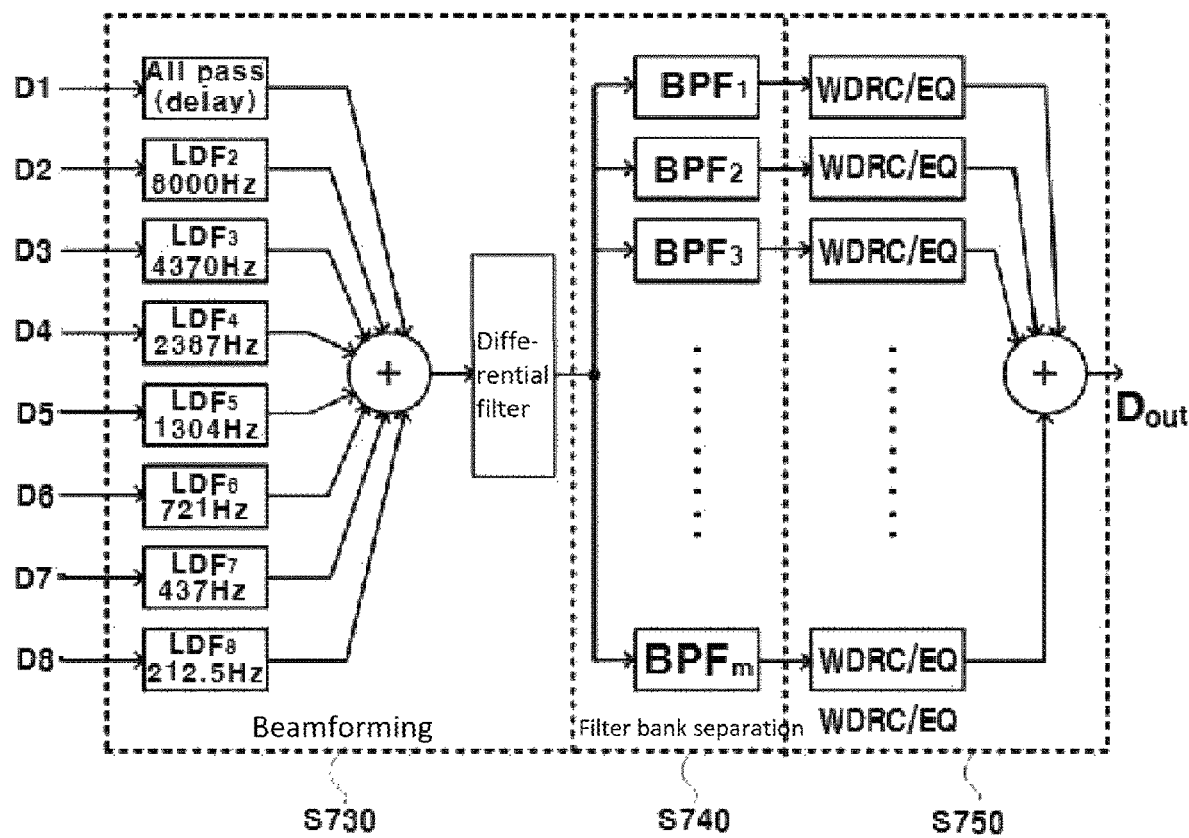
FIG. 12 is a detailed diagram of beamforming, filter bank separation, wide dynamic range compression, and equalization operations included in the digital signal processing program of FIG. 11.

FIG. 12 is a detailed diagram of the beamforming S730, the filter bank separation S740, and the wide dynamic range compression (WDRC) and frequency equalization operation S750 included in the digital signal processing program of FIG. 11.

In FIG. 12, D1, D2, D3, D4, D5, D6, D7 and D8 show data, that is, results obtained by converting analog signals, output by m1, m2, m3, m4, m5, m6, m7, and m8 configuring the microphone array 300 of FIG. 6, into digital signals through the analog-digital converter 120 and storing the digital signals in the input data buffer of the smartphone RAM 230 for each microphone.

In the beamforming operation S730, a single signal is generated by adding all eight signals passing through one all-pass filter and 7 low pass filters (LPFs). The single signal is output by applying a differential filter, having a transfer function size proportional to a signal frequency, to the single signal.

Frequencies proposed along with the LPFs of FIG. 12 indicate the band widths of the LPFs. In the filter bank separation operation S740, a plurality of bandpass filters (BPFs) having neighboring passband widths is configured, and separates the output signal of the beamforming operation S730 into a plurality of bandpass signals. In the WDRC and frequency equalization operation S750, after a different WDRC and frequency equalization operation is performed on each of the plurality of bandpass signals, a single output signal Dout is generated by adding all the resulting values. The output signal Dout is stored in the output data buffer 233 of the smartphone RAM 230.

As shown in FIG. 12, after the output signals of the microphones pass through the respective filters and are added together so that they have the same latency, only a sound propagated in the direction in which the microphones of FIG. 7 have been arranged is well heard by the beamforming operation. If D1, D2, D3, D4, D5, D6, D7, and D8 of FIG. 12 are made to have different latency and multiplied by different constant values and all the resulting values are added together, the direction in which an output signal is well heard may be changed based on a combination of latency and a multiplied constant value through the beamforming operation.

It is better when latency is short as much as possible until a sound signal is processed and output to the speaker after the sound signal is input from the hearing aid to the microphone. When the latency is about 35 ms (0.035 second) or more, a user feels inconvenient because a sound transferred to an ear through the hearing aid and a sound directly transferred to the ear without the intervention of the hearing aid are separately recognized and thus the single sound signal is heard by the ear twice.

In recent high spec. and high-priced hearing aids, latency of the hearing aid is commonly 10 ms (0.01 second) or less. An embodiment of the present invention sets a goal of the latency within 20 ms (0.02 second).

In an embodiment of the present invention, if a second path of FIG. 1 is selected, the audio data processing unit of the smartphone is 240 samples, and the sampling rate of an input analog signal is 48 kS/sec, audio data is output to the speaker at once every 5 ms (0.005 second). Accordingly, the digital signal processing program for a hearing aid operation in FIG. 11 processes data in a 240-sample unit. In an embodiment of the present invention, if the second path 2 of FIG. 1 is selected, latency from timing in which a voice signal is input to the microphone array 300 to timing in which the voice signal is output by the speaker 600 through the hearing aid according to the present invention is calculated by Equation 2.

Latency when second path of FIG. 1 is selected=ADC processing time (1 ms)+Read FIFO-to-RAM transfer time through USB (2 ms)+Software signal processing time (5 ms)+ RAM-to-CODEC DAC transfer time (3 ms)+ DAC wait time (5 ms)+DAC processing time (1 ms)=17 ms    [Equation 2]

In an embodiment of the present invention, the analog-digital converter (ADC) 120 is configured with a delta-sigma modulator and a decimation filter. After the analog-digital conversion operation is completed within 1 ms (0.01 second), latency from timing in which the output signal of the analog-digital converter 120 is input to the read FIFO memory 130 through the USB interface to timing in which the output signal reaches the input data buffer 232 of the RAM 230 within the smartphone is about 2 ms (0.002 second), that is, two frame times of the USB1.1 standard.

An operation for the AP 210 to read data of 240 samples, that is, an audio signal processing unit, from the input data buffer 232 of the RAM 230, to fetch and perform the software signal processing program stored in the app program storage 231, and to store the corresponding resulting data in the output data buffer 233 of the RAM 230 is completed within 5 ms (0.005 second).

Next, an operation of reading the data of 240 samples stored in the output data buffer 233 and transferring the data to the DAC 250 of the audio codec is completed within 3 ms (0.003 second). A wait time of a maximum of 5 ms (0.005 second) is taken to output the data of 240 samples from the buffer of the DAC 250. If a DAC of a delta-sigma method is used, latency shown in Equation 2 is calculated as 17 ms (0.017 second) because a processing time of 1 ms is necessary.

Assuming that latency not yet considered in the latency of 17 ms is 3 ms, in the hearing aid according to the present invention, latency from timing in which a sound signal is input to the microphone array 300 to timing in which the sound signal is output to the speaker 600 of the smartphone through the hearing aid according to the present invention may be within 20 ms (0.02 second).

In this case, the signal processing time of Equation 2 becomes within 5 ms using the GPU 212 of the smartphone as the co-processor of the CPU 211.

In an embodiment of the present invention, if the first path of FIG. 1 is selected, the latency may be significantly reduced because the RAM-to-CODEC DAC transfer time (3 ms) and the DAC wait time (5 ms) of Equation 2. However, two times the USB 1.1 frame time (1 ms) is additionally taken to transmit data from the output data buffer 233 of the smartphone RAM to the write FIFO memory 180 of the analog interface unit. Accordingly, latency from the microphone 300 to the speaker 600 when the first path of FIG. 1 is adopted is calculated as 11 ms according to Equation 3.

Latency when first path of FIG. 1 is selected=ADC processing time (1 ms)+Read FIFO-to-RAM transfer time through USB (2 ms)+Software signal processing time (5 ms)+RAM-to-write FIFO transfer time through USB (2 ms)+ Speaker driver circuit (1 ms)=11 ms    [Equation 3]

In Equation 3, the latency of the speaker driver circuit 180 was calculated, assuming that the speaker driver circuit includes the digital-analog converter of the delta-sigma method. Assuming that latency that has not yet been considered is 3 ms, if the latency is added to the value calculated in Equation 3, the latency becomes 14 ms.

As described above, the smartphone-based hearing aid according to the present invention implements the analog interface unit, connecting the microphones and the smartphone, using a single integrated circuit chip, and minimizes a digital signal processing time performed in software in the smartphone using both the CPU and the GPU embedded in the AP of the smartphone. Accordingly, latency until a signal received by the microphones is output from the microphones to the speaker through the smartphone can be minimized, and thus the hearing aid having a low price and excellent performance can be implemented.

In the present invention, all the spirits proposed in relation to the hearing aid may be applied to personal sound amplification products (PSAPs).

Although the present invention has been described in connection with the embodiments illustrated in the drawings, the embodiments are only illustrative. A person having ordinary skill in the art will understand that various modifications and other equivalent embodiments are possible from the present invention. Accordingly, the true technical range of protection of the present invention should be determined by the technical spirit of the following claims.

The invention claimed is:

1. A smartphone-based hearing aid, comprising:
a microphone array configured with a plurality of microphones for converting a received sound signal into an electric signal and outputting the electric signal;
an analog interface unit having a function for receiving a plurality of analog signals output by the microphone array, amplifying the analog signals, converting the amplified analog signals into respective digital signals, and outputting the digital signals to a smartphone and selectively having a function for converting a digital signal, received from the smartphone, into an analog signal and outputting the analog signal to a speaker;
the smartphone performing signal processing necessary for a hearing aid operation on the digital signal received from the analog interface unit and outputting the signal-processed digital signal to the analog interface unit or converting the signal-processed digital signal into the analog signal and outputting the analog signal to the speaker;
the speaker converting the analog signal, received from the analog interface unit or the smartphone, into a sound signal;
a first connection device connecting the analog interface unit and the smartphone;
a second connection device configured with a third audio jack connecting the speaker to the smartphone or the analog interface unit and an audio cable connected to the third audio jack; and
a third connection device connecting the microphone array and the analog interface unit,
wherein the third connection device connected to the microphone array is physically coupled to the audio cable.

2. The smartphone-based hearing aid of claim 1, wherein the analog interface unit comprises:
a plurality of analog amplifiers respectively amplifying the plurality of analog signals received from the microphone array through the third connection device;
analog-digital converters receiving output signals of the analog amplifiers, respectively, and converting the output signals into the digital signals;
read FIFO memory receiving the output signals of the analog-digital converters and outputting data to a serial data transmission and reception unit;
a device serial data transceiver having a function for receiving the output signal of the read FIFO memory and transferring the output signal to the smartphone through the first connection device, a function for receiving an amp gain control signal to control an amp gain of the analog amplifier from the smartphone, and a function for transferring the received amp gain control signal to the analog amplifier;
a clock generator generating a first clock signal applied to the analog-digital converter, a second clock signal applied to the read FIFO memory, and a third clock signal applied to the device serial data transceiver; and
a supply voltage converter receiving a DC voltage VCC from the smartphone through the first connection device, and generating supply voltages supplied to the analog amplifier, the analog-digital converter, the read FIFO memory, the device serial data transceiver, the clock generator, and the third connection device, respectively.

3. The smartphone-based hearing aid of claim 2, wherein the analog interface unit comprises:

write FIFO memory receiving data from the smartphone through the device serial data transceiver; and a speaker driver circuit receiving the data from the write FIFO memory, and outputting two analog signals to drive earphones configuring the speaker, the speaker driver circuit comprising a delta-sigma modulator, wherein the analog interface unit further comprises a first audio jack transferring the two analog signals, received from the speaker driver circuit, to the second connection device.

4. The smartphone-based hearing aid of claim 2, wherein the circuits configuring the analog interface unit are implemented in a single integrated circuit chip.

5. The smartphone-based hearing aid of claim 2, wherein the smartphone comprises:

an application processor (AP) comprising a central processing unit and a graphic processing unit;

a host serial data transceiver connecting the AP and the first connection device through a data port;

RAM connected to the AP;

a display/touch sensor module connected to the AP;

a supply voltage generator generating a DC supply voltage and supplying the DC supply voltage to the first connection device through the data port; and flash memory.

6. The smartphone-based hearing aid of claim 5, wherein the smartphone comprises:

a second audio jack connecting the second connection device and the smartphone; and a digital-analog converter connecting the second audio jack and the AP.

7. The smartphone-based hearing aid of claim 6, wherein the RAM comprises:

an input data buffer storing data transferred from the analog interface unit to the smartphone through the first connection device;

app program storage unit storing an app program executed in the AP; and an output data buffer storing data to be output to the speaker.

8. The smartphone-based hearing aid of claim 7, wherein the app program comprises:

a digital signal processing program performing digital signal processing necessary for an operation of the hearing aid on data read from the input data buffer and storing corresponding resulting data in the output data buffer;

a driver program driving the host serial data transceiver, the display/touch sensor module, and the digital-analog converter; and an amp gain determination program calculating an amp gain value of the analog amplifier.

9. The smartphone-based hearing aid of claim 8, wherein the digital signal processing program performs a function for:

reading the data from the input data buffer of the RAM, calibrating read data values for each microphone so that serial connection devices of the plurality of microphones and the plurality of analog amplifiers have an identical sensitivity characteristic based on the read data, generating a single signal by performing a beamforming operation on the calibrated data values, generating a plurality of signals having different frequency bands by performing filter bank separation operation on the single signal, performing a wide dynamic range compression operation and an equalization operation on each of the plurality of signals, and generating a single final signal by adding corresponding resulting data and storing the final signal in the output data buffer of the RAM.

10. The smartphone-based hearing aid of claim 6, wherein:

the audio cable has one end connected to the third audio jack and has another end connected to two earphones disposed at both ears of a user to configure the speaker, and the third audio jack is selectively connected to the first audio jack of the analog interface unit or the second audio jack of the smartphone.

11. The smartphone-based hearing aid of claim 10, wherein the third connection device comprises:

a plurality of conducting wires comprising a conducting wire for supplying a DC voltage and a conducting wire for transmitting an analog signal;

a plurality of printed circuit boards;

one connector; and a supporting rod having one rod shape, wherein the plurality of printed circuit boards is disposed in a serial form along the supporting rod, one or a plurality of the microphones is attached to a surface of each of the plurality of printed circuit boards, the plurality of microphones is electrically connected to the connector through a plurality of conducting wires, respectively, the connector is connected to the analog interface unit and electrically connects the plurality of microphones to the analog interface unit, the supporting rod comprises a rod of a well-bent and hollow pipe form, the plurality of printed circuit boards and the plurality of conducting wires are disposed in an inside empty space of the supporting rod, and the supporting rod functions to mechanically support and protect the plurality of printed circuit boards, the plurality of microphones attached to the surfaces of the plurality of printed circuit boards, and the plurality of conducting wires.

12. The smartphone-based hearing aid of claim 11, wherein the supporting rod configuring the third connection device and the audio cable configuring the second connection device are closely disposed in parallel in a length direction and are physically coupled.

13. The smartphone-based hearing aid of claim 11, wherein:

the plurality of microphones configuring the microphone array is disposed in a serial form along the supporting rod configuring the third connection device, and intervals between two adjacent microphones are irregularly disposed.

14. The smartphone-based hearing aid of claim 11, wherein when the plurality of microphones configuring the microphone array is sequentially disposed in a serial form along the supporting rod configuring the third connection device in a direction being distant from the analog interface unit, starting from a location close to the analog interface unit, an interval between a first positioned microphone (M1) and a second positioned microphone (M2) is determined to be a size half a wavelength of a sound wave of a considered highest frequency input sound signal, and an interval between a microphone (MN+1) to be next positioned from a third positioned microphone and the first positioned microphone (M1) is determined to be a value obtained by multiplying the interval between a previously positioned microphone (MN) and the first positioned microphone (M1) by a given constant value.

15. The smartphone-based hearing aid of claim 14, wherein:
a signal received from the first positioned microphone (M1) passes through an all-pass filter,
a signal received from the second positioned microphone (M2) passes through a low pass filter having a bandwidth identical with a highest frequency of the highest frequency input sound signal,
a signal received from the third positioned microphone (M3) passes through a low pass filter having a value, obtained by dividing a bandwidth applied to a signal received from a previously positioned microphone by the given constant value, as a bandwidth,
a sum signal is generated by adding all resulting signal values obtained by passing signals, received from the plurality of microphones, through respective filters, and
a beamformed signal is generated by passing the sum signal through a differential filter.

16. The smartphone-based hearing aid of claim 15, wherein:
the sum signal is generated by applying different latency to each of the resulting signal values obtained by passing the signals received from the plurality of microphones through respective filters, multiplying each of the signal values by a different constant, and adding all the resulting signal values, and
the beamformed signal is generated by passing the sum signal through the differential filter.

17. The smartphone-based hearing aid of claim 5, wherein the smartphone reduces a time taken to perform a beamforming, wide dynamic range compression, filter bank separation or frequency equalization function by performing the function using the graphic processing unit of the AP.

18. The smartphone-based hearing aid of claim 5, wherein the graphic processing unit is used as a co-processor of the central processing unit.

19. The smartphone-based hearing aid of claim 2, wherein the device serial data transceiver transmits data according to a USB 1.1 standard through the first connection device.

20. The smartphone-based hearing aid of claim 1, wherein the analog interface unit does not have filter bank separation, wide dynamic range compression, and frequency equalization functions necessary for an operation of the hearing aid.

21. The smartphone-based hearing aid of claim 1, wherein the smartphone performs a beamforming, filter bank separation, wide dynamic range compression, or frequency equalization function using software.

22. The smartphone-based hearing aid of claim 1, wherein when the second connection device connects the speaker to the smartphone, latency until a sound signal received by the microphone is output by the speaker as a sound signal sequentially through the third connection device, the analog interface unit, the first connection device, the smartphone, and the second connection device is 0.02 sec or less.

23. The smartphone-based hearing aid of claim 1, wherein when the second connection device connects the speaker to the analog interface unit, latency until a sound signal received by the microphone is output by the speaker as a sound signal sequentially through the third connection device, the analog interface unit, the first connection device, the smartphone, the first connection device, the analog interface unit, and the second connection device is 0.014 sec or less.

24. The smartphone-based hearing aid of claim 1, wherein the analog interface unit is supplied with a DC voltage from the smartphone through the first connection device instead of a separate power supply device.

25. The smartphone-based hearing aid of claim 1, wherein the digital signal processing necessary for an operation of the hearing aid is performed using an application processor of the smartphone instead of a separate digital signal processing chip.

26. The smartphone-based hearing aid of claim 1, wherein the first connection device has one end connected to a data port of the smartphone and comprises a conducting wire for supplying a DC voltage and a conducting wire for transmitting data.

27. The smartphone-based hearing aid of claim 1, wherein a device for configuring the analog interface unit so that the analog interface unit is positioned at a back of the smartphone is coupled and fixed to a smartphone casing attached to the smartphone or is directly physically coupled and fixed to the smartphone.

28. The smartphone-based hearing aid of claim 1, wherein the analog interface unit is fabricated in a dongle form and couples analog interface unit to the smartphone through a data port of the smartphone.

* * * * *